US011927156B2

(12) United States Patent
Nam

(10) Patent No.: US 11,927,156 B2
(45) Date of Patent: Mar. 12, 2024

(54) APPARATUS FOR REDUCING GREENHOUSE GAS EMISSION IN VESSEL COOPERATED WITH EXHAUST GAS RECIRCULATION AND VESSEL INCLUDING THE SAME

(71) Applicant: DAEWOO SHIPBUILDING & MARINE ENGINEERING CO., LTD., Geoje-si (KR)

(72) Inventor: Byung Tak Nam, Geoje-si (KR)

(73) Assignee: DAEWOO SHIPBUILDING & MARINE ENGINEERING CO., LTD.

( * ) Notice: Subject to any disclaimer, the term of this patent is extended or adjusted under 35 U.S.C. 154(b) by 0 days.

(21) Appl. No.: 18/011,818

(22) PCT Filed: Dec. 17, 2020

(86) PCT No.: PCT/KR2020/018599
§ 371 (c)(1),
(2) Date: Dec. 20, 2022

(87) PCT Pub. No.: WO2022/019409
PCT Pub. Date: Jan. 27, 2022

(65) Prior Publication Data

US 2023/0243322 A1 Aug. 3, 2023

(30) Foreign Application Priority Data

Jul. 21, 2020 (KR) ........................ 10-2020-0090479

(51) Int. Cl.
*F02M 37/12* (2006.01)
*B01D 47/06* (2006.01)
(Continued)

(52) U.S. Cl.
CPC ............ *F02M 26/35* (2016.02); *B01D 47/06* (2013.01); *B01D 53/1481* (2013.01);
(Continued)

(58) Field of Classification Search
CPC ........ F02M 26/35; F02M 26/05; F02M 26/28; F02M 26/34; F02M 26/36; F02M 26/37;
(Continued)

(56) References Cited

U.S. PATENT DOCUMENTS

2015/0322833 A1 11/2015 Menon et al.

FOREIGN PATENT DOCUMENTS

DK 2894307 T3 * 4/2013 ............. B01D 53/62
EP 2965801 B1 * 1/2019 ......... B01D 53/1425
(Continued)

OTHER PUBLICATIONS

English copy of WO201203577 by PE2E Oct. 7, 2022.*
(Continued)

*Primary Examiner* — Deming Wan
(74) *Attorney, Agent, or Firm* — Park, Kim & Suh, LLC

(57) ABSTRACT

The present invention relates to an apparatus for reducing greenhouse gas emission in a vessel cooperated with exhaust gas recirculation (EGR), and a vessel including the same, in which $NO_X$ generation is reduced, which is the original purpose of EGR, while maintaining existing EGR, $SO_X$ as well as $CO_2$, which is the representative greenhouse gas, are absorbed and converted into materials that do not affect environments, and the materials are discharged or stored as useful materials, thereby preventing corrosion of an engine and improving combustion efficiency.

17 Claims, 5 Drawing Sheets

(51) Int. Cl.

| | |
|---|---|
| ***B01D 53/14*** | (2006.01) |
| ***B01D 53/62*** | (2006.01) |
| ***B01D 53/78*** | (2006.01) |
| ***B63H 21/14*** | (2006.01) |
| ***F02B 37/12*** | (2006.01) |
| ***F02M 26/05*** | (2016.01) |
| ***F02M 26/28*** | (2016.01) |
| ***F02M 26/34*** | (2016.01) |
| ***F02M 26/35*** | (2016.01) |
| ***F02M 26/36*** | (2016.01) |
| ***F02M 26/37*** | (2016.01) |

(52) U.S. Cl.
CPC ............. *B01D 53/62* (2013.01); *B01D 53/78* (2013.01); *B63H 21/14* (2013.01); *F02B 37/12* (2013.01); *F02M 26/05* (2016.02); *F02M 26/28* (2016.02); *F02M 26/34* (2016.02); *F02M 26/36* (2016.02); *F02M 26/37* (2016.02); *B01D 2251/604* (2013.01); *B01D 2252/103* (2013.01); *B01D 2257/302* (2013.01); *B01D 2257/504* (2013.01); *B01D 2258/01* (2013.01); *B01D 2259/4566* (2013.01)

(58) Field of Classification Search
CPC .... F02M 37/12; B01D 47/06; B01D 53/1481; B01D 53/62; B01D 53/78; B63H 21/14
See application file for complete search history.

(56) References Cited

FOREIGN PATENT DOCUMENTS

| | | | | | |
|---|---|---|---|---|---|
| JP | 2006-096572 | A | | 4/2006 | |
| JP | 2010-101320 | A | | 5/2010 | |
| JP | 2017-210963 | A | | 11/2017 | |
| KR | 10-1201426 | B1 | | 11/2012 | |
| KR | 10-2013-0078308 | A | | 7/2013 | |
| KR | 10-2014-0083180 | A | | 7/2014 | |
| KR | 10-2015-0075663 | A | | 7/2015 | |
| KR | 10-2015-0112824 | A | | 10/2015 | |
| KR | 10-2016-0102339 | A | | 8/2016 | |
| KR | 20190070694 | A | * | 6/2019 | ................ B63J 1/00 |
| KR | 10-2031210 | B1 | | 10/2019 | |
| KR | 10-2020-0115919 | A | | 10/2020 | |
| WO | WO-2012035777 | A1 | * | 3/2012 | ............. B01D 53/62 |

OTHER PUBLICATIONS

Englsh copy of KR 20190070694 by PE2E Oct. 7, 2022.*
English copy of EP2965801 by PE2E Oct. 7, 2022.*
International Search Report in International Application No. PCT/KR2020/018599, dated Oct. 28, 2021, 3 pages.

* cited by examiner

APPARATUS FOR REDUCING GREENHOUSE GAS EMISSION IN VESSEL COOPERATED WITH EXHAUST GAS RECIRCULATION AND VESSEL INCLUDING THE SAME

CROSS-REFERENCE TO RELATED APPLICATIONS

This application is a National Phase Application of PCT International Application No. PCT/KR2020/018599, which was filed on Dec. 17, 2020, and which claims priority from Korean Patent Application No. 10-2020-0090479 filed on Jul. 21, 2020. The disclosures of the above patent applications are incorporated herein by reference in their entirety.

TECHNICAL FIELD

The present invention relates to an apparatus for reducing greenhouse gas emission in a vessel cooperated with exhaust gas recirculation (EGR), and a vessel including the same, in which $NO_X$ generation is reduced, which is the original purpose of EGR, while maintaining existing EGR, $SO_X$ as well as $CO_2$, which is the representative greenhouse gas, are absorbed and converted into materials that do not affect environments, and the materials are discharged or stored as useful materials, thereby preventing corrosion of an engine and improving combustion efficiency.

BACKGROUND ART

Recently, global warming and related environmental disasters have occurred due to the influence of greenhouse gas emission caused by indiscriminate use of fossil fuels.

In this regard, a series of technologies related to capture and storage of carbon dioxide, which is the representative greenhouse gas, without carbon dioxide emission are called carbon dioxide capture and storage (CCS) technologies. In recent years, CCS technologies have attracted much attention. Among CCS technologies, chemical absorption is the most commercialized technology in terms of enabling large-scale treatment.

In addition, carbon dioxide emission is regulated through the IMO's EEDI. The IMO is targeting a reduction of 50% or more in emissions by 2050 compared to 2008 and a reduction of 40% in emissions by 2030 compared to 2008. Therefore, technologies that do not emit $CO_2$ or capture emitted $CO_2$ are attracting attention.

The above-described technologies for reducing carbon dioxide emission or capturing generated carbon dioxide are not currently commercialized in vessels, and methods of using hydrogen or ammonia as fuel are currently under development and have not reached the level of commercialization.

On the other hand, as a method of reducing $NO_X$ in exhaust gas exhausted from a vessel engine, exhaust gas recirculation (EGR) for mixing a portion of exhaust gas with compressed scavenge air and recirculating the mixed gas to the intake system of the vessel engine is applied.

Therefore, there is a need to apply a technology capable of reducing $NO_X$ generation, which is the original purpose of EGR, while maintaining EGR with respect to a vessel that is operating using conventional fossil fuels or is scheduled to be built, absorbing $SO_X$ as well as $CO_2$, which is the representative greenhouse gas, converting $SO_X$ and $CO_2$ into materials that do not affect environments, discharging the materials, or storing the materials as useful materials.

DISCLOSURE

Technical Problem

An object of the present invention is to provide an apparatus for reducing greenhouse gas emission in a vessel cooperated with EGR, and a vessel including the same, in which $NO_X$ generation is reduced, which is the original purpose of EGR, while maintaining EGR, $SO_X$ as well as $CO_2$, which is the representative greenhouse gas, are absorbed and converted into materials that do not affect environments, and the materials are discharged or stored as useful materials, thereby preventing corrosion of an engine and improving combustion efficiency.

Technical Solution

In order to achieve the above object, the present invention provides an apparatus for reducing greenhouse gas emission in a vessel cooperated with EGR, the apparatus including: an exhaust gas receiver that temporarily stores exhaust gas exhausted from each cylinder of a vessel engine and removes pulsation; a cleaning unit that removes and cleans $SO_X$ and soot by spraying cleaning water to the exhaust gas supplied from the exhaust gas receiver and cools the exhaust gas by circulating cooling water; a $CO_2$ absorbing unit that absorbs and removes $CO_2$ by spraying an absorbent liquid to the exhaust gas having passed through the cleaning unit; and a scavenge air receiver that temporarily stores the exhaust gas having passed through the $CO_2$ absorbing unit, removes pulsation, mixes the exhaust gas with scavenge air, and supplies the mixed gas to each cylinder of the vessel engine.

In addition, the cleaning unit may include: a cleaning water supply module that receives fresh water, neutralizes and supplies the cleaning water; a cleaning module that cools and cleans the exhaust gas supplied from the exhaust gas receiver by spraying the cleaning water supplied from the cleaning water supply module to the exhaust gas supplied from the exhaust gas receiver; a cooling module that cools the exhaust gas through the cooling water; a cleaning water circulation module that circulates the cleaning water having passed through the cleaning module; and a water treatment module that performs water treatment on the cleaning water.

In addition, the cleaning water supply module may include: a cleaning water replenishing pump that receives the fresh water, replenishes the cleaning water, and supplies the cleaning water to the cleaning module; and a neutralizing agent supply valve that supplies a neutralizing agent for controlling pH to the cleaning water supplied from the cleaning water replenishing pump to the cleaning module, the cleaning module may include one or more cleaning units that remove and clean $SO_X$ and soot by spraying the cleaning water, the cooling module may include one or more cooling units formed below the one or more cleaning units to cool the exhaust gas to a certain temperature according to a type of the absorbent liquid by the circulating cooling water, the cleaning water circulation module may include: a cleaning water circulation tank that collects the cleaning water having passed through the cleaning module; a pH meter that measures pH of the cleaning water from the cleaning water circulation tank, controls the neutralizing agent supply valve to determine an input amount of the neutralizing agent; a buffer tank that stores an initial amount of cleaning water and replenishes the cleaning water; and a cleaning water circulation pump that circulates a portion of the cleaning water to the buffer tank and circulates a portion of the cleaning water to the cleaning module, and the water treatment module may include: a water treatment unit that performs water treatment on the cleaning water drained from the buffer tank and returns the treated cleaning water to the buffer tank; a sludge tank that stores sludge by the water treatment unit; an outboard discharge valve that discharges the cleaning water satisfying a certain discharge condition by the water treatment unit to the outside of the vessel; and a cleaning water drain tank that temporarily stores the cleaning water from the buffer tank.

In addition, the apparatus may further include a cleaning water cooling unit that is installed behind the cleaning water circulation pump and cools the circulating cleaning water.

In addition, the $CO_2$ absorbing unit may include: an absorbent liquid storage tank that stores the absorbent liquid; one or more spray nozzles that spray the absorbent liquid; one or more passages that converts $CO_2$ into a certain material through a chemical reaction by contacting $CO_2$ with the absorbent liquid; an absorbent liquid spray pump that pumps the absorbent liquid to the one or more spray nozzles; and a cooling module that circulates the cooling water to the one or more passages and cools heat generated by a $CO_2$ absorption reaction.

In addition, the one or more spray nozzles may include an upper spray nozzle and a lower spray nozzle that spray the absorbent liquid downward, the one or more passages may include an upper passage and a lower passage that convert $CO_2$ into the certain material through a chemical reaction by contacting $CO_2$ with the absorbent liquid, the absorbent liquid spray pump may pump the absorbent liquid to the upper spray nozzle and the lower spray nozzle, the cooling module may cool heat generated by the $CO_2$ absorption reaction by circulating the cooling water to the upper passage and the lower passage, and the $CO_2$ absorbing unit may further include: a mist catcher that is formed in a curved multi-plate shape and removes moisture from the exhaust gas having passed through the lower passage; and an exhaust gas recirculation fan that increases pressure of the exhaust gas, from which the moisture has been removed, and recirculates the exhaust gas to the scavenge air receiver.

In addition, the upper passage or the lower passage may be provided with a plurality of stages and partition walls to form a long passage so as to increase a contact time between the absorbent liquid and the exhaust gas.

In addition, packing materials, in which distilling column packings designed to have a large contact area per unit volume so as to increase a contact time between the absorbent liquid and the exhaust gas are provided in multi-stages, and a solution redistributor, which is formed between the distilling column packings provided in multi-stages, may be formed in the upper passage or the lower passage.

In addition, the absorbent liquid storage tank may store $NH_4OH(aq)$ as the absorbent liquid, $CO_2$ may be absorbed and converted into $NH_4HCO_3(aq)$ by $NH_4OH(aq)$ passing through the upper passage and the lower passage, and the cooling module may be disposed in the form of a cooling jacket or a cooling coil in the upper passage and the lower passage and cools heat generated by the $CO_2$ absorption reaction to 20° C. to 50° C.

In addition, the absorbent liquid storage tank may store NaOH as the absorbent liquid, $CO_2$ may be absorbed and converted into $NaHCO_3$ or $Na_2CO_3$ by $NH_4OH$ passing through the upper passage and the lower passage, and the cooling module may cool heat generated by the $CO_2$ absorption reaction to 80° C. to 100° C.

In addition, upon operating in a Tier II mode, a reverse flow of the scavenge air to the exhaust gas recirculation fan may be prevented through a valve on an outlet side of the exhaust gas recirculation fan, and a blowing pressure of the exhaust gas recirculation fan may be adjusted according to pressure of the scavenge air to increase pressure of the exhaust gas from which the moisture has been removed.

In addition, the apparatus may further include a turbo charger including: a turbine that is rotated by high-temperature and high-pressure exhaust gas supplied from the exhaust gas receiver; a compressor that is coupled to a rotation shaft of the turbine and rotated to compress the scavenge air and supply the compressed scavenge air to the scavenge air receiver; an air suction filter that is formed on a suction port side of the compressor to filter foreign matter; a scavenge air cooling module that cools the scavenge air supplied from the compressor to the scavenge air receiver; a first control valve that controls a flow rate of the exhaust gas supplied from the exhaust gas receiver to the turbine; and a second control valve that is formed in front of the first control valve to control a flow rate of the exhaust gas supplied to the cleaning unit.

In addition, the apparatus may further include a third control valve that controls a flow rate of the exhaust gas supplied from the exhaust gas receiver to the cleaning unit, wherein, when damage to an exhaust gas use-related device connected to an exhaust gas pipe connected to the turbine is expected due to a high load or high-temperature exhaust gas, opening or closing of the third control valve may be controlled so that the flow rate of the exhaust gas to the cleaning unit is increased to decrease a temperature of the exhaust gas.

In addition, the scavenge air cooling module may include: a cooling jacket of one or more stages that cools the scavenge air by circulating cooling water; and a mist catcher that is formed in a curved multi-plate shape and removes moisture from the scavenge air having passed through the cooling jacket.

In addition, the apparatus may further include an absorbent liquid tank that separates and stores the absorbent liquid drained from the $CO_2$ absorbing unit, wherein emissions discharged from the $CO_2$ absorbing unit are stored in the sludge tank or discharged to the outside of the vessel.

In addition, the cleaning unit and the $CO_2$ absorbing unit may be mounted inside the vessel engine.

In order to achieve the above object, the present invention provides a vessel including the above-described apparatus.

Advantageous Effects

According to the present invention, there is an effect that can reduce $NO_X$ generation, which is the original purpose of EGR, while maintaining EGR with respect to a vessel that is operating using conventional fossil fuels or is scheduled to be built, can absorb $SO_X$ as well as $CO_2$, which is the representative greenhouse gas, can convert $SO_X$ and $CO_2$ into materials that do not affect environments, can discharge the materials, or can store the materials as useful materials.

In addition, when the absorbed $CO_2$ is stored in the vessel, the absorbed $CO_2$ may be processed after the operation of the vessel, thereby reducing the possibility of marine pollution.

In addition, since $SO_X$ and $CO_2$ are removed from the recirculating exhaust gas, there is an effect that can prevent corrosion of the engine and can reduce environmental pollution.

Furthermore, the apparatus may be mounted inside the vessel engine so as to save the installation space, thereby securing the free space. The apparatus may be additionally installed in the vessel in which the existing EGR system is already installed, thereby reducing the changes therein.

BEST MODE

Hereinafter, embodiments of the present invention will be described in detail with reference to the accompanying drawings so that the present invention can be easily carried out by those of ordinary skill in the art. The present invention may be embodied in many different forms and is not limited to embodiments of the present invention described herein.

Figure 1:
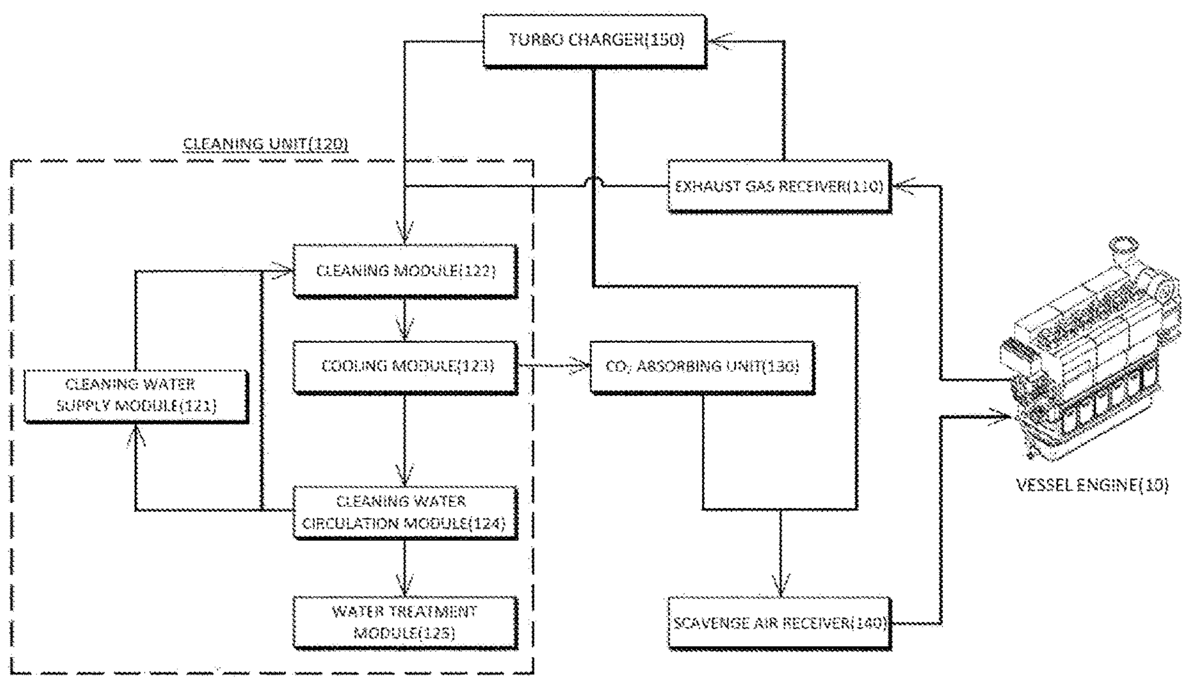
FIG. 1 is a schematic configuration diagram of an apparatus for reducing greenhouse gas emission in a vessel cooperated with EGR, according to an embodiment of the present invention.

Referring to FIG. 1, an apparatus for reducing greenhouse gas emission in a vessel cooperated with EGR includes: an exhaust gas receiver 110 that temporarily stores exhaust gas exhausted from each cylinder of a vessel engine 10 and removes pulsation; a cleaning unit 120 that removes and cleans $SO_X$ and soot by spraying cleaning water to the exhaust gas supplied from the exhaust gas receiver 110 and cools the exhaust gas by circulating cooling water; a $CO_2$ absorbing unit 130 that absorbs and removes $CO_2$ by spraying an absorbent liquid to the exhaust gas having passed through the cleaning unit 120; and a scavenge air receiver 140 that temporarily stores the exhaust gas having passed through the $CO_2$ absorbing unit 130, removes pulsation, mixes the exhaust gas with scavenge air, and supplies the mixed gas to each cylinder of the vessel engine 10. Therefore, $NO_X$ generation is reduced, which is the original purpose of EGR, while maintaining existing EGR, $SO_X$ as well as $CO_2$, which is the representative greenhouse gas, are absorbed and converted into materials that do not affect environments, and the materials are discharged or stored as useful materials, thereby preventing corrosion of an engine and improving combustion efficiency.

Hereinafter, the apparatus for reducing greenhouse gas emission in the vessel cooperated with EGR will be described in detail with reference to FIGS. 1 to 5.

Figure 2:
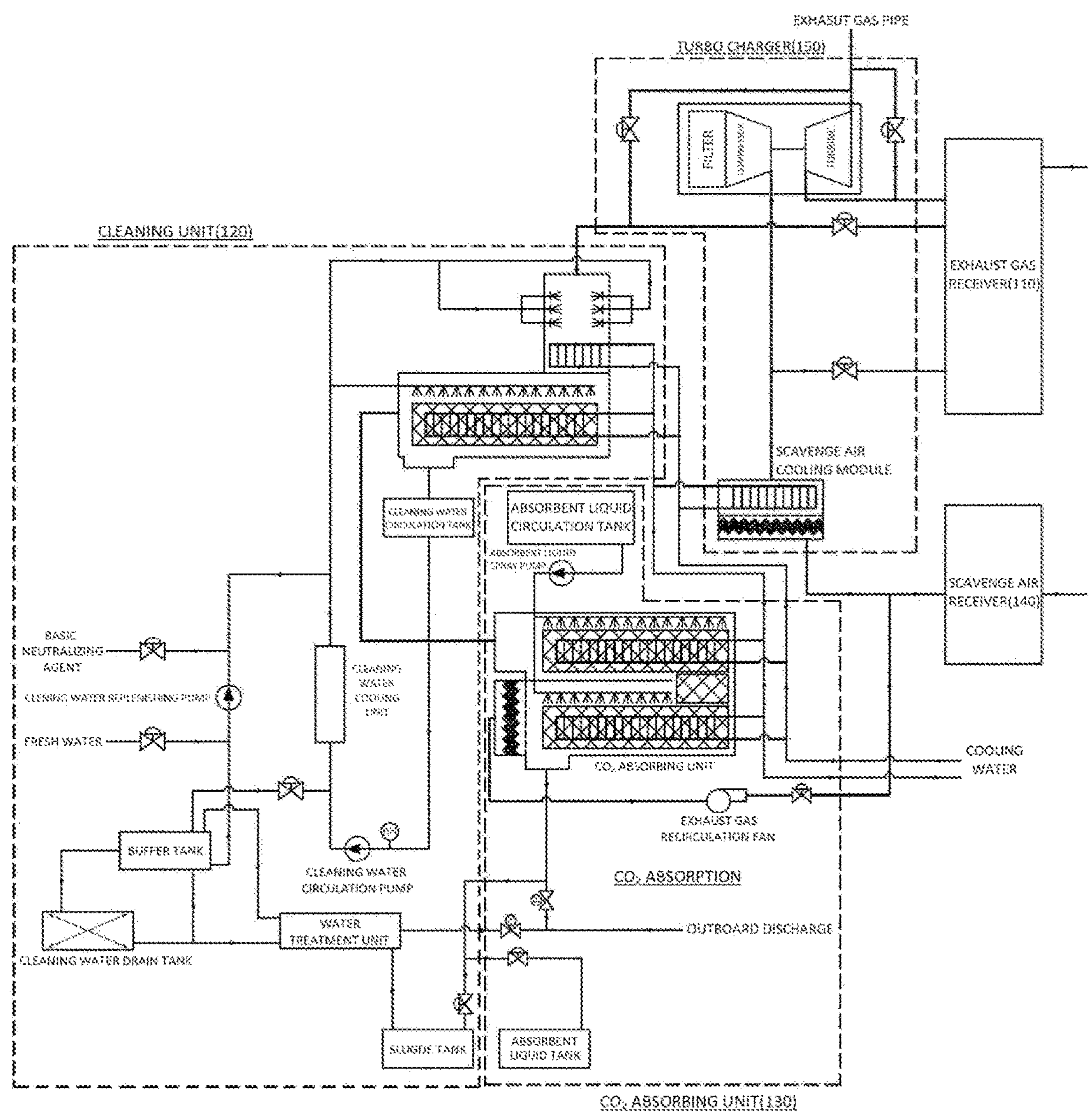
FIG. 2 is a hydraulic circuit diagram of a system implementing the apparatus for reducing greenhouse gas emission in a vessel cooperated with EGR, illustrated in FIG. 1.
Figure 3:
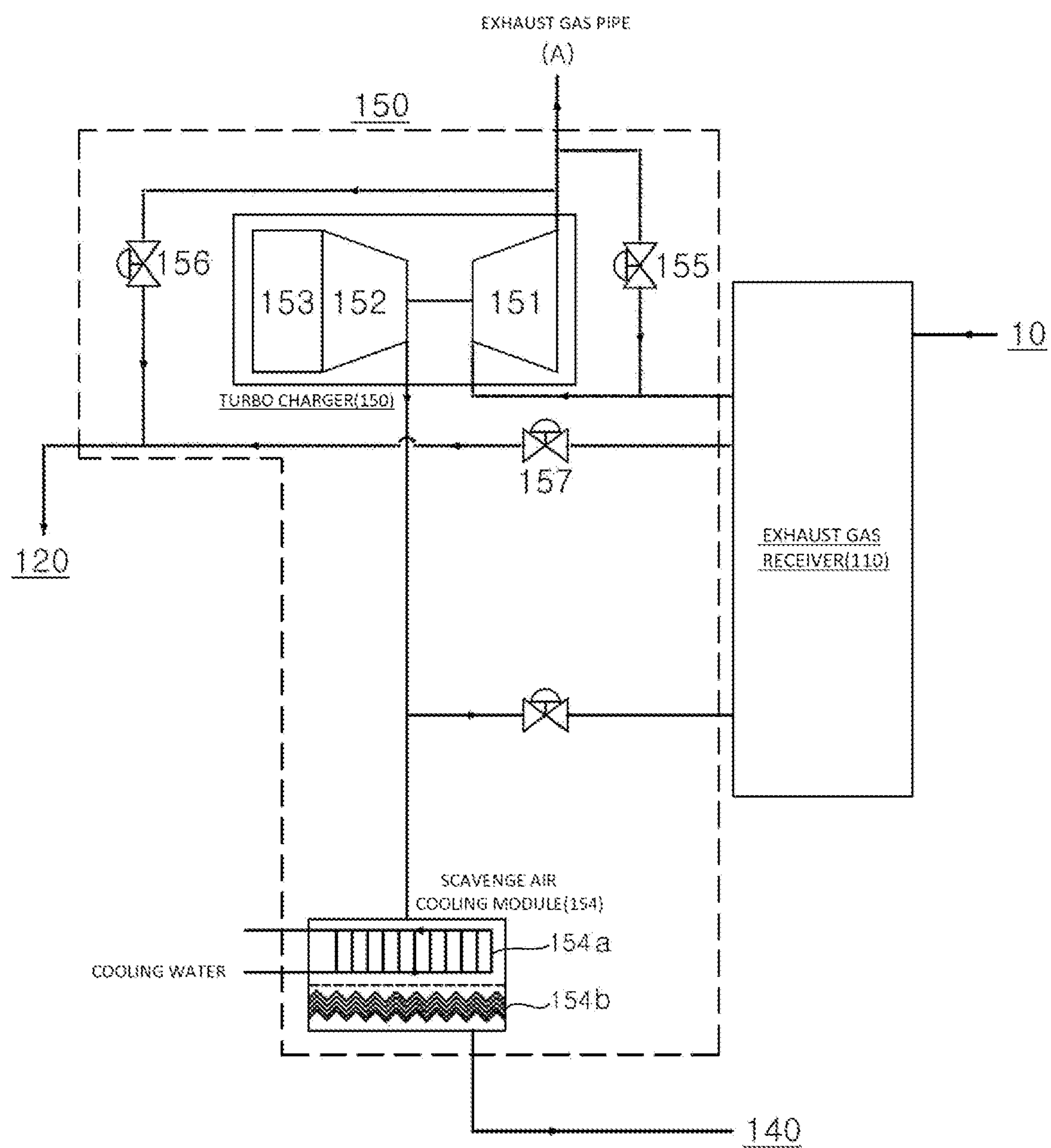
FIG. 3 separately illustrates an exhaust gas receiver and a turbo charger in the apparatus for reducing greenhouse gas emission in a vessel cooperated with EGR, illustrated in FIG. 2.

First, as illustrated in FIGS. 2 and 3, the exhaust gas receiver 110 temporarily stores high-temperature and high-pressure exhaust gas exhausted from an exhaust gas discharge port by an exhaust stroke after combustion from a combustion chamber of each of a plurality of cylinders (not illustrated) of the vessel engine 10, removes the pulsation of the exhaust gas, and supplies the exhaust gas to the cleaning unit 120 or the turbo charger 120, which is provided at a rear stage, through opening or closing of a control valve.

For example, since the ignition order for each cylinder is different, the discharge timing of the exhaust gas is also different to cause pulsation. The exhaust gas receiver 110 is formed in a cylinder shape that has a capacity suitable for removing the pulsation of the exhaust gas pressure and can keep warm. One side of the exhaust gas receiver 110 is connected to the exhaust gas discharge port of the combustion chamber, and the other side of the exhaust gas receiver 110 is connected to the inlet side of the turbine 151 of the turbo charger 150 or the inlet side of the cleaning module 122 of the cleaning unit 120.

Next, the cleaning unit (EGR) 120 is a component that cleans, cools, and neutralizes the exhaust gas. The cleaning unit 120 removes and cleans $SO_X$ and soot contained in the exhaust gas by sequentially spraying cleaning water primarily or secondarily to the exhaust gas supplied from the exhaust gas receiver 110, and cools the exhaust gas by circulating cooling water, and supplies the cooled exhaust gas to the $CO_2$ absorbing unit 130.

For reference, in the combustion chamber, a portion of oxygen contained in the scavenge air is combusted with fuel to generate $CO_2$, and the remaining portion thereof generates $NO_X$ and $SO_X$. The cleaning unit 120 cleans and cools the exhaust gas containing a large amount of $CO_2$ after combustion, and supplies only the minimum $O_2$ required for combustion to the combustion chamber of the vessel engine 10 together with the scavenge air from the turbo charger 150, thereby increasing the $CO_2$ concentration of the scavenge air itself and lowering the $O_2$ concentration to suppress the generation of $NO_N$.

On the other hand, the reduction amount of $NO_X$ is also increased in proportion to the recirculation rate of the exhaust gas, and about 30% to 40% of the entire exhaust gas may be recirculated and supplied to the vessel engine 10.

Figure 4:
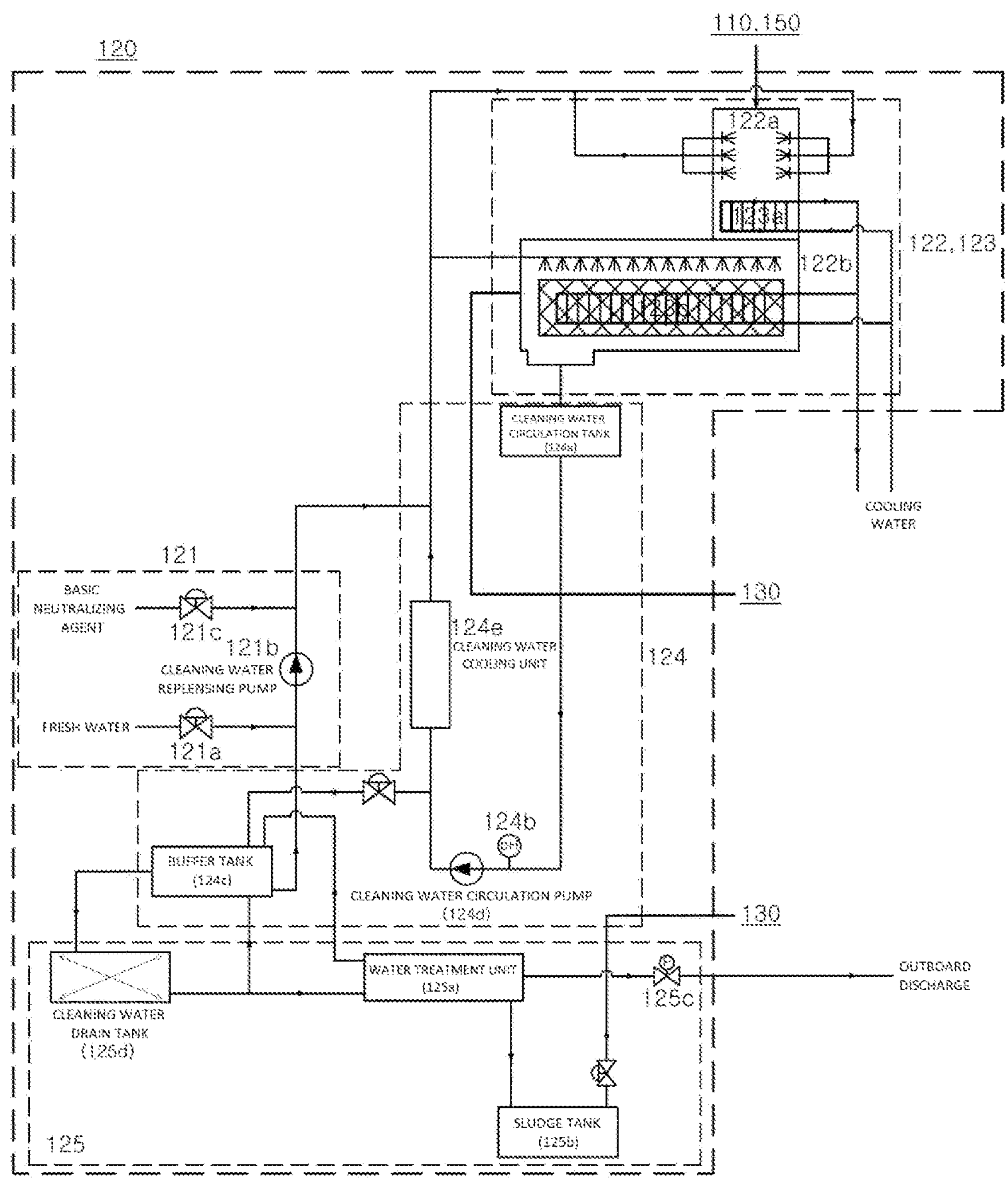
FIG. 4 separately illustrates a cleaning unit in the apparatus for reducing greenhouse gas emission in a vessel cooperated with EGR, illustrated in FIG. 2.

Specifically, as illustrated in FIGS. 2 and 4, the cleaning unit 120 may include: a cleaning water supply module 121 that receives fresh water, neutralizes and supplies the cleaning water; a cleaning module 122 that cools and cleans the exhaust gas supplied from the exhaust gas receiver 110 by spraying the cleaning water supplied from the cleaning water supply module 122 to the exhaust gas supplied from the exhaust gas receiver 121; a cooling module 123 that cools the exhaust gas through the cooling water; a cleaning water circulation module 124 that circulates the cleaning water having passed through the cleaning module 132 so as to reuse the cleaning water; and a water treatment module (water treatment system (WTS)) 125 that performs water treatment on the cleaning water.

Here, the cleaning water supply module 121 includes: a cleaning water replenishing pump **121*b* that receives fresh water through a fresh water supply valve 121*a*, replenishes the cleaning water, and supplies the cleaning water to the cleaning module 122; and a neutralizing agent supply valve 121*c* that supplies a basic neutralizing agent for removing sulfuric acid generated by $SO_X$ of the exhaust gas to the cleaning water supplied from the cleaning water replenishing pump 121*b* to the cleaning module 122**.

In addition, the cleaning module 122 includes: a first cleaning unit **122*a* disposed at a front stage to pre-spray the cleaning water supplied from the cleaning water supply module 121 or the cleaning water circulation module 124 to the exhaust gas to cool the high-temperature exhaust gas to 200° C. to 300° C. and remove and clean particle components such as $SO_X$ and soot; and a second cleaning unit 122***b* disposed at a rear stage to post-spray the cleaning water (EGR cooler spray) to cool the exhaust gas to about 45° C. and remove and clean particle components such as $SO_X$ and soot.

In addition, the cooling module 123 includes: a first cooling unit 123*a* formed below the first cleaning unit 122*a* to cool the exhaust gas to a certain temperature according to the type of the absorbent liquid used for absorbing $CO_2$ by the circulating cooling water; and a second cooling unit 123*b* formed below the second cleaning unit 122*b* to cool the exhaust gas to a certain temperature according to the type of the absorbent liquid used for absorbing $CO_2$ by the circulating cooling water.

In addition, the cleaning water circulation module 124 includes: a cleaning water circulation tank 124*a* that collects the cleaning water having passed through the cleaning module 122; a pH meter 124*b* that measures pH of the cleaning water from the cleaning water circulation tank 124*a*, controls the neutralizing agent supply valve 121*c* to determine the input amount of the basic neutralizing agent; a buffer tank 124*c* that stores the initial amount of cleaning water and replenishes the cleaning water to the cleaning module 122; and a cleaning water circulation pump 124*d* that circulates a portion of the cleaning water to the buffer tank 124*c* and circulates a portion of the cleaning water to the cleaning module 122.

Here, the pH meter 124*b* may measure pH due to sulfuric acid contained in the circulating cleaning water and neutralize the cleaning water by controlling the neutralizing agent supply valve 121*c* to adjust the input amount of the basic neutralizing agent, for example, NaOH, according to the measured pH, thereby preventing corrosion of pipelines and related components through which the cleaning water circulates. The buffer tank 124*c* may collect and remove additional moisture generated incidentally by combustion of the exhaust gas, and may store and replenish the purified cleaning water treated by the water treatment module 125.

On the other hand, the cleaning water circulation module 124 may further include a cleaning water cooling unit 124*e* installed behind the cleaning water circulation pump 124*d* to cool the circulating cleaning water. The cleaning water cooling unit 124*e* may cool the cleaning water to a lower temperature and supply the cooled cleaning water to the cleaning module 122.

On the other hand, in the case of using $NH_4OH$(aq) as the absorbent liquid of the $CO_2$ absorbing unit 130, the temperature of the exhaust gas passing through the cleaning module 122 is appropriate between 20° C. and 50° C. In the case of using NaOH as the absorbent liquid of the $CO_2$ absorbing unit 130, the temperature of the exhaust gas is appropriate between 80° C. and 100° C. Therefore, the amount and temperature of the cleaning water are different according to the absorbent liquid used. The combination of the cleaning module 122 and the cleaning water cooling unit 124*e* may be differently applied to satisfy the $CO_2$ absorption temperature condition of the $CO_2$ absorbing unit 130 while maintaining the cleaning power of the exhaust gas by the cleaning water, and the specifications of heat exchangers of the first cleaning unit 122*a* and the second cleaning unit 122*b* may be differently applied.

In addition, the water treatment module 125 includes: a water treatment unit 125*a* that performs water treatment on the cleaning water drained from the buffer tank 124*c* by centrifugation or filtering and returns the treated cleaning water to the buffer tank 124*c*; a sludge tank 125*b* that stores sludge discharged by the water treatment unit 125*a*; an outboard discharge valve 125*c* that discharges the cleaning water satisfying a certain outboard discharge condition by the water treatment unit 125*a* to the outside of the vessel; and a cleaning water drain tank 125*d* that temporarily stores the cleaning water from the buffer tank 124*c*. The water treatment module 125 separates and stores debris such as soot contained in the cleaning water and discharges the separated discharged water to the outside of the vessel.

Next, the $CO_2$ absorbing unit 130 absorbs and removes $CO_2$ by spraying the absorbent liquid to the exhaust gas having passed through the cleaning unit 130.

Figure 5:
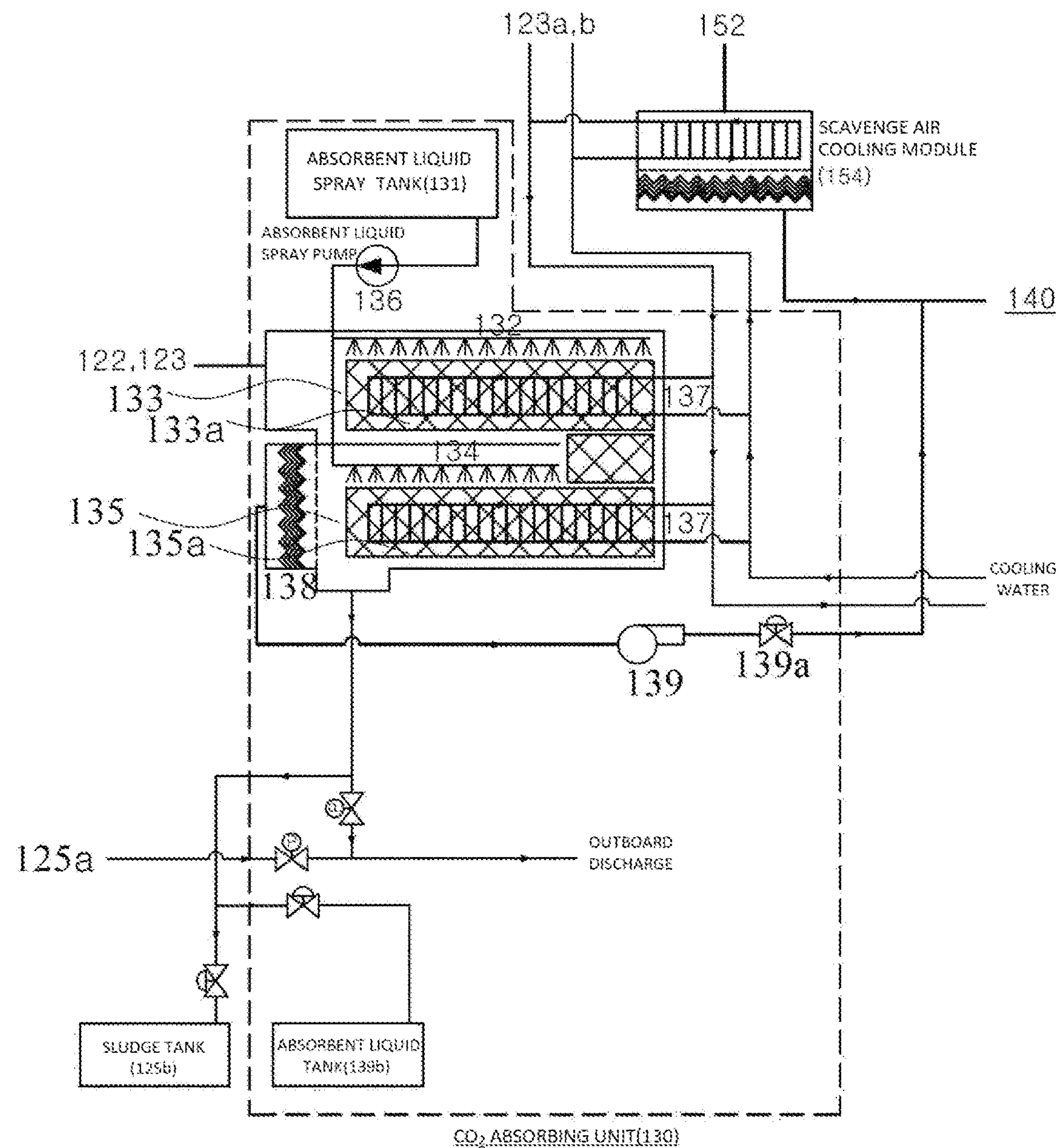
FIG. 5 separately illustrates a $CO_2$ absorbing unit in the apparatus for reducing greenhouse gas emission in a vessel cooperated with EGR, illustrated in FIG. 2.

Specifically, as illustrated in FIGS. 2 and 5, the $CO_2$ absorbing unit 130 includes: an absorbent liquid storage tank 131 that stores the absorbent liquid for removing $CO_2$ through a chemical reaction; an upper spray nozzle 132 that sprays the absorbent liquid downward; an upper passage 133 that converts $CO_2$ into $NH_4HCO_3$, $NaHCO_3$, or $Na_2CO_3$ through a chemical reaction by physically contacting $CO_2$ with the absorbent liquid; a lower spray nozzle 134 that sprays the absorbent liquid downward; a lower passage 135 that converts $CO_2$ into $NH_4HCO_3$, $NaHCO_3$, or $Na_2CO_3$ through a chemical reaction by physically contacting $CO_2$ with the absorbent liquid; an absorbent liquid spray pump 136 that pumps the absorbent liquid to the upper spray nozzle 132 and the lower spray nozzle 134; a cooling module 137 that circulates the cooling water to the upper passage 133 and the lower passage 135 and cools heat generated by a $CO_2$ absorption reaction; a mist catcher 138 that is formed in a curved multi-plate shape and removes moisture from the exhaust gas having passed through the lower passage 135; and an exhaust gas recirculation fan 139 that increases the pressure of the exhaust gas, from which the moisture has been removed, and recirculates the exhaust gas to the scavenge air receiver 140.

Here, the absorbent liquid may be prepared through a separate facility in the vessel and supplied immediately, but may be pumped and supplied in the form stored in the absorbent liquid storage tank 131, and the upper spray nozzle 132 and the lower spray nozzle 134 may be applied in the form in which a plurality of auxiliary pipes having a plurality of spray holes connected to a main pipe are installed.

On the other hand, the upper passage 133 or the lower passage 135 is provided with a plurality of stages and partition walls to form a long passage so as to increase a contact time between the absorbent liquid and the exhaust gas. The upper passage 133 or the lower passage 135 sufficiently absorbs and dissolves $CO_2$ by the absorbent liquid, or converts $CO_2$ into a material satisfying the outboard discharge conditions.

In addition, packing materials 133*a* and 135*b* and a solution redistributor (not illustrated) may be formed in the upper passage 133 or the lower passage 135. In the packing materials 133*a* and 135*b*, distilling column packings designed to have a large contact area per unit volume so as to increase the contact time between the absorbent liquid and the exhaust gas are provided in multi-stages. The solution redistributor is formed between the distilling column packings provided in multi-stages.

For example, a distilling column packing suitable for a process may be selected considering the contact area per unit area, the pressure drop of the gas, and the overflow rate. Channeling of fresh water may be prevented by the solution redistributor.

On the other hand, the products and the cooling methods may be different according to the selection of the absorbent liquid that absorbs $CO_2$. That is, in the case of using $NH_4OH$(aq) as the absorbent liquid, the absorbent liquid storage tank 131 stores $NH_4OH$(aq) as the absorbent liquid, and $CO_2$ is absorbed and converted into $NH_4HCO_3$(aq) by $NH_4OH$(aq) passing through the upper passage 133 and the lower passage 135 based on [Chemical Formula 1] or [Chemical Formula 2]. The cooling module 123 is disposed in the form of a cooling jacket or a cooling coil in the upper passage 133 and the lower passage 135. Thus, by cooling heat generated by a $CO_2$ absorption reaction to 20° C. to 50° C., a smooth forward reaction of [Chemical Formula 1] or [Chemical Formula 2] may be induced.

That is, when the heat is less than 20° C., the $CO_2$ absorption rate decreases, and when the heat is greater than 50° C., the $CO_2$ absorption rate may increase, but $NH_3$ may be vaporized and disappeared. Therefore, the heat may be preferably maintained between 20° C. and 50° C.

$$NH_4OH+H_2CO_3 \rightarrow H_2O+NH_4HCO_3 \quad \text{[Chemical Formula 1]}$$

$$2NH_4OH+CO_2 \rightarrow (NH_4)_2CO_3+H_2O$$

$$(NH_4)_2CO_3+CO_2+H_2O \rightarrow 2NH_4HCO_3 \quad \text{[Chemical Formula 2]}$$

Alternatively, in the case of using NaOH as the absorbent liquid, the absorbent liquid storage tank 131 stores NaOH as the absorbent liquid, and $CO_2$ is absorbed and converted into $Na2CO_3$ or $NaHCO_3$ by NaOH passing through the upper passage 133 and the lower passage 135 based on, for example, [Chemical Formula 3] or [Chemical Formula 4]. Since the cooling module 123 cools heat generated by a $CO_2$ absorption reaction to 80° C. to 100° C., a smooth forward reaction of [Chemical Formula 3] or [Chemical Formula 4] may be induced.

$$2NaOH(aq)+CO_2(g) \rightarrow Na_2CO_3(aq)+H_2O(l) \quad \text{[Chemical Formula 3]}$$

$$Na_2CO_3(aq)+H_2O(l) \rightarrow 2NaHCO_3(aq) \quad \text{[Chemical Formula 4]}$$

On the other hand, in an emission control area (ECA), Tier III is applied as the $NO_X$ emission standard, and EGR should be driven to reduce $NO_X$ of exhaust gas to below the $NO_X$ emission standard. However, upon operating in a Tier II mode, which is applied in the open sea where the driving of EGR is not essential, the reverse flow of scavenge air to the exhaust gas recirculation fan 139 is prevented through the valve 139*a* on the outlet side of the exhaust gas recirculation fan 139, and the blowing pressure of the exhaust gas recirculation fan 139 is adjusted according to the pressure of the scavenge air by an RPM control method (variable frequency driver (VFD)), thereby increasing the pressure of the exhaust gas from which moisture has been removed.

In addition, an absorbent liquid tank 139*b* that separates and stores the absorbent liquid drained through the upper passage 133 and the lower passage 135 of the $CO_2$ absorbing unit 130 may be further included so that the absorbent liquid is recycled or disposed of. Emissions discharged from the $CO_2$ absorbing unit 130 may be stored in the sludge tank 125*b* or discharged to the outside of the vessel by the valve control.

Next, as illustrated in FIG. 2, a scavenge air receiver 140 temporarily stores combustion air, from which $CO_2$ is removed by passing through the $CO_2$ absorbing unit 130 and of which $O_2$ concentration is lowered, removes pulsation, mixes the exhaust gas with scavenge air in a suction stroke, and supplies the mixed gas to each cylinder of the vessel engine 10.

For example, since the ignition order for each cylinder is different, the suction timing of the scavenge air is also different to cause pulsation. The scavenge air receiver 140 is formed in a cylinder shape that has a capacity suitable for removing the pulsation of the scavenge gas pressure and can keep warm. One side of the scavenge air receiver 140 is connected to the scavenge air suction port of the combustion chamber, and the other side of the scavenge air receiver 140 is connected to an outlet side of a compressor 152 of the turbo charger 130 or a scavenge air cooling module 154.

Next, as illustrated in FIG. 3, the turbo charger 150 may include: a turbine 151 that is rotated by the high-temperature and high-pressure exhaust gas supplied from the exhaust gas receiver 110; a compressor 152 that is coupled to a rotation shaft of the turbine 151 and rotated to compress scavenge air and supply the compressed scavenge air to the scavenge air receiver 140; an air suction filter 153 that is formed on the suction port side of the compressor 152 to filter foreign matter; a scavenge air cooling module 154 that cools the scavenge air supplied from the compressor 152 to the scavenge air receiver 140; a first control valve 155 that controls a flow rate of the exhaust gas supplied from the exhaust gas receiver 110 to the turbine 151; and a second control valve 156 that is formed in front of the first control valve 155 to control a flow rate of the exhaust gas supplied to the cleaning unit 120. The turbo charger 150 may increase engine efficiency by compressing the scavenge air using the high-temperature and high-pressure energy of the exhaust gas.

On the other hand, the turbo charger 150 may further include a third control valve 157 that controls a flow rate of the exhaust gas supplied from the exhaust gas receiver 110 to the cleaning unit 120. When damage to an exhaust gas use-related device (e.g., a steam generation device) connected to the exhaust gas pipe A connected to the outlet side of the turbine 151 is expected due to a high load or high-temperature exhaust gas, the opening or closing of the third control valve 157 may be controlled so that the flow rate of the exhaust gas to the cleaning unit 120 is increased to decrease the temperature of the exhaust gas.

In addition, the scavenge air cooling module 154 may include: a cooling jacket 154*a* of one stage or two stages that cools scavenge air by circulating cooling water; and a mist catcher 154*b* that is formed in a curved multi-plate shape and removes moisture from the scavenge air having passed through the cooling jacket 154*a*. The scavenge air cooling module 154 may lower the increase in temperature due to compression of scavenge air by the compressor 152 to increase turbo charger efficiency and air density, thereby improving the efficiency of the vessel engine 10.

On the other hand, the cleaning unit 120 and the $CO_2$ absorbing unit 130 may be mounted inside the vessel engine 10 so as to save the installation space, and may be additionally installed in the vessel in which the existing EGR system is already installed, thereby reducing the changes therein.

Therefore, according to the apparatus for reducing greenhouse gas emission in the vessel cooperated with EGR, $NO_X$ generation is reduced, which is the original purpose of EGR, while maintaining existing EGR, $SO_X$ as well as $CO_2$, which is the representative greenhouse gas, are absorbed and converted into materials that do not affect environments, and the materials are discharged or stored as useful materials, thereby preventing corrosion of an engine and improving combustion efficiency. In addition, since $SO_X$ and $CO_2$ are removed from the recirculating exhaust gas, corrosion of the engine can be prevented and environmental pollution can be reduced. Furthermore, the apparatus may be mounted inside the vessel engine so as to save the installation space, thereby securing the free space. The apparatus may be additionally installed in the vessel in which the existing EGR system is already installed, thereby reducing the changes therein.

The present invention has been described above with reference to the embodiments illustrated in the drawings. However, the present invention is not limited thereto, and various modifications or other embodiments falling within the scope equivalent to the present invention can be made by those of ordinary skill in the art. Therefore, the true scope of protection of the present invention should be determined by the appended claims.

What is claimed is:

1. An apparatus for reducing greenhouse gas emission in a vessel cooperated with EGR, the apparatus comprising:

an exhaust gas receiver that temporarily stores exhaust gas exhausted from each cylinder of a vessel engine and removes pulsation;

a cleaning unit that removes and cleans $SO_X$ and soot by spraying cleaning water to the exhaust gas supplied from the exhaust gas receiver and cools the exhaust gas by circulating cooling water;

a $CO_2$ absorbing unit that absorbs and removes $CO_2$ by spraying an absorbent liquid to the exhaust gas having passed through the cleaning unit;

a scavenge air receiver that temporarily stores the exhaust gas having passed through the $CO_2$ absorbing unit, removes pulsation, mixes the exhaust gas with scavenge air, and supplies the mixed gas to each cylinder of the vessel engine; and a turbo charger comprising:

a turbine that is rotated by high-temperature and high-pressure exhaust gas supplied from the exhaust gas receiver;

a compressor that is coupled to a rotation shaft of the turbine and rotated to compress the scavenge air and supply the compressed scavenge air to the scavenge air receiver;

an air suction filter that is formed on a suction port side of the compressor to filter foreign matter;

a scavenge air cooling module that cools the scavenge air supplied from the compressor to the scavenge air receiver;

a first control valve that controls a flow rate of the exhaust gas supplied from the exhaust gas receiver to the turbine; and a second control valve that is formed in front of the first control valve to control a flow rate of the exhaust gas supplied to the cleaning unit.

2. The apparatus according to claim 1, wherein the cleaning unit comprises:

a cleaning water supply module that receives fresh water, neutralizes and supplies the cleaning water;

a cleaning module that cools and cleans the exhaust gas supplied from the exhaust gas receiver by spraying the cleaning water supplied from the cleaning water supply module to the exhaust gas supplied from the exhaust gas receiver;

a cooling module that cools the exhaust gas through the cooling water;

a cleaning water circulation module that circulates the cleaning water having passed through the cleaning module; and a water treatment module that performs water treatment on the cleaning water.

3. The apparatus according to claim 2, wherein the cleaning water supply module comprises:

a cleaning water replenishing pump that receives the fresh water, replenishes the cleaning water, and supplies the cleaning water to the cleaning module; and a neutralizing agent supply valve that supplies a neutralizing agent for controlling pH to the cleaning water supplied from the cleaning water replenishing pump to the cleaning module, wherein the cleaning module comprises one or more cleaning units that remove and clean $SO_X$ and soot by spraying the cleaning water, wherein the cooling module comprises one or more cooling units formed below the one or more cleaning units to cool the exhaust gas to a certain temperature according to a type of the absorbent liquid by the circulating cooling water, wherein the cleaning water circulation module comprises:

a cleaning water circulation tank that collects the cleaning water having passed through the cleaning module;

a pH meter that measures pH of the cleaning water from the cleaning water circulation tank, controls the neutralizing agent supply valve to determine an input amount of the neutralizing agent;

a buffer tank that stores an initial amount of cleaning water and replenishes the cleaning water; and a cleaning water circulation pump that circulates a portion of the cleaning water to the buffer tank and circulates a portion of the cleaning water to the cleaning module, and wherein the water treatment module comprises:

a water treatment unit that performs water treatment on the cleaning water drained from the buffer tank and returns the treated cleaning water to the buffer tank;

a sludge tank that stores sludge by the water treatment unit;

an outboard discharge valve that discharges the cleaning water satisfying a certain discharge condition by the water treatment unit to the outside of the vessel; and a cleaning water drain tank that temporarily stores the cleaning water from the buffer tank.

4. The apparatus according to claim 3, further comprising a cleaning water cooling unit that is installed behind the cleaning water circulation pump and cools the circulating cleaning water.

5. The apparatus according to claim 3, further comprising an absorbent liquid tank that separates and stores the absorbent liquid drained from the $CO_2$ absorbing unit, wherein emissions discharged from the $CO_2$ absorbing unit are stored in the sludge tank or discharged to the outside of the vessel.

6. The apparatus according to claim 1, wherein the $CO_2$ absorbing unit comprises:

an absorbent liquid storage tank that stores the absorbent liquid;

one or more spray nozzles that spray the absorbent liquid;

one or more passages that converts $CO_2$ into a certain material through a chemical reaction by contacting $CO_2$ with the absorbent liquid;

an absorbent liquid spray pump that pumps the absorbent liquid to the one or more spray nozzles; and a cooling module that circulates the cooling water to the one or more passages and cools heat generated by a $CO_2$ absorption reaction.

7. The apparatus according to claim 6, wherein the one or more spray nozzles comprise an upper spray nozzle and a lower spray nozzle that spray the absorbent liquid downward, wherein the one or more passages comprise an upper passage and a lower passage that convert $CO_2$ into the certain material through a chemical reaction by contacting $CO_2$ with the absorbent liquid, wherein the absorbent liquid spray pump pumps the absorbent liquid to the upper spray nozzle and the lower spray nozzle, wherein the cooling module cools heat generated by the $CO_2$ absorption reaction by circulating the cooling water to the upper passage and the lower passage, and wherein the $CO_2$ absorbing unit further comprises:

a mist catcher that is formed in a curved multi-plate shape and removes moisture from the exhaust gas having passed through the lower passage; and an exhaust gas recirculation fan that increases pressure of the exhaust gas, from which the moisture has been removed, and recirculates the exhaust gas to the scavenge air receiver.

8. The apparatus according to claim 7, wherein the upper passage or the lower passage is provided with a plurality of stages and partition walls to form a long passage so as to increase a contact time between the absorbent liquid and the exhaust gas.

9. The apparatus according to claim 7, wherein packing materials, in which distilling column packings designed to have a large contact area per unit volume so as to increase a contact time between the absorbent liquid and the exhaust gas are provided in multi-stages, and a solution redistributor, which is formed between the distilling column packings provided in multi-stages, are formed in the upper passage or the lower passage.

10. The apparatus according to claim 7, wherein the absorbent liquid storage tank stores $NH_4OH(aq)$ as the absorbent liquid, wherein $CO_2$ is absorbed and converted into $NH_4HCO_3(aq)$ by $NH_4OH(aq)$ passing through the upper passage and the lower passage, and wherein the cooling module is disposed in the form of a cooling jacket or a cooling coil in the upper passage and the lower passage and cools heat generated by the $CO_2$ absorption reaction to 20° C. to 50° C.

11. The apparatus according to claim 7, wherein the absorbent liquid storage tank stores NaOH as the absorbent liquid, wherein $CO_2$ is absorbed and converted into $NaHCO_3$ or $Na_2CO_3$ by $NH_4OH$ passing through the upper passage and the lower passage, and wherein the cooling module cools heat generated by the $CO_2$ absorption reaction to 80° C. to 100° C.

12. The apparatus according to claim 7, wherein, upon operating in a Tier II mode, a reverse flow of the scavenge air to the exhaust gas recirculation fan is prevented through a valve on an outlet side of the exhaust gas recirculation fan, and wherein a blowing pressure of the exhaust gas recirculation fan is adjusted according to pressure of the scavenge air to increase pressure of the exhaust gas from which the moisture has been removed.

13. The apparatus according to claim 1, further comprising a third control valve that controls a flow rate of the exhaust gas supplied from the exhaust gas receiver to the cleaning unit, wherein, when damage to an exhaust gas use-related device connected to an exhaust gas pipe connected to the turbine is expected due to a high load or high-temperature exhaust gas, opening or closing of the third control valve is controlled so that the flow rate of the exhaust gas to the cleaning unit is increased to decrease a temperature of the exhaust gas.

14. The apparatus according to claim 1, wherein the scavenge air cooling module comprises:

a cooling jacket of one or more stages that cools the scavenge air by circulating cooling water; and a mist catcher that is formed in a curved multi-plate shape and removes moisture from the scavenge air having passed through the cooling jacket.

15. The apparatus according to claim 1, wherein the cleaning unit and the $CO_2$ absorbing unit are mounted inside the vessel engine.

16. A vessel comprising the apparatus according to claim 1.

17. An apparatus for reducing greenhouse gas emission in a vessel cooperated with EGR, the apparatus comprising:

an exhaust gas receiver that temporarily stores exhaust gas exhausted from each cylinder of a vessel engine and removes pulsation;

a cleaning unit that removes and cleans $SO_X$ and soot by spraying cleaning water to the exhaust gas supplied from the exhaust gas receiver and cools the exhaust gas by circulating cooling water;

a $CO_2$ absorbing unit that absorbs and removes $CO_2$ by spraying an absorbent liquid to the exhaust gas having passed through the cleaning unit; and a scavenge air receiver that temporarily stores the exhaust gas having passed through the $CO_2$ absorbing unit, removes pulsation, mixes the exhaust gas with scavenge air, and supplies the mixed gas to each cylinder of the vessel engine, wherein the $CO_2$ absorbing unit comprises:

an absorbent liquid storage tank that stores the absorbent liquid;

one or more spray nozzles that spray the absorbent liquid;

one or more passages that converts $CO_2$ into a certain material through a chemical reaction by contacting $CO_2$ with the absorbent liquid;

an absorbent liquid spray pump that pumps the absorbent liquid to the one or more spray nozzles; and a cooling module that circulates the cooling water to the one or more passages and cools heat generated by a $CO_2$ absorption reaction, wherein the one or more spray nozzles comprise an upper spray nozzle and a lower spray nozzle that spray the absorbent liquid downward, wherein the one or more passages comprise an upper passage and a lower passage that convert $CO_2$ into the certain material through a chemical reaction by contacting $CO_2$ with the absorbent liquid, wherein the absorbent liquid spray pump pumps the absorbent liquid to the upper spray nozzle and the lower spray nozzle, wherein the cooling module cools heat generated by the $CO_2$ absorption reaction by circulating the cooling water to the upper passage and the lower passage, and wherein the $CO_2$ absorbing unit further comprises:

a mist catcher that is formed in a curved multi-plate shape and removes moisture from the exhaust gas having passed through the lower passage; and an exhaust gas recirculation fan that increases pressure of the exhaust gas, from which the moisture has been removed, and recirculates the exhaust gas to the scavenge air receiver.

* * * * *